United States Patent [19]

Muramatsu et al.

[11] Patent Number: 5,447,365
[45] Date of Patent: Sep. 5, 1995

[54] RUBBER TRACK ASSEMBLY

[75] Inventors: Tateo Muramatsu; Masaru Ishibashi, both of Yokohama; Harumichi Yamazaki, Tokyo, all of Japan

[73] Assignee: Bridgestone Corporation, Tokyo, Japan

[21] Appl. No.: 89,494

[22] Filed: Jul. 12, 1993

[30] Foreign Application Priority Data

Jul. 10, 1992 [JP] Japan ................... 4-207309

[51] Int. Cl.$^6$ ............................................. B62D 55/24
[52] U.S. Cl. .................................... 305/38; 305/56
[58] Field of Search .................. 305/35 R, 35 EB, 38, 305/39, 56, 57

[56] References Cited

U.S. PATENT DOCUMENTS

| | | |
|---|---|---|
| 3,118,709 | 1/1964 | Case . |
| 3,721,477 | 3/1973 | Cooper et al. . |
| 3,774,979 | 11/1973 | Harris . |
| 3,779,617 | 12/1973 | Palmaer . |
| 3,900,231 | 8/1975 | Ohm . |
| 4,863,420 | 9/1989 | Ivy . |

FOREIGN PATENT DOCUMENTS

| | | | |
|---|---|---|---|
| 1020990 | 11/1977 | Canada . | |
| 709659 | 1/1931 | France | 305/35 EB |
| 2107614 | 5/1972 | France . | |
| 3319067 | 11/1984 | Germany . | |
| 0124444 | 9/1979 | Japan | 305/57 |
| 0055065 | 4/1980 | Japan | 305/35 EB |
| 0087664 | 7/1980 | Japan | 305/57 |
| 0120462 | 9/1981 | Japan | 305/35 EB |
| 0106378 | 6/1984 | Japan | 305/57 |
| 1126170 | 9/1968 | United Kingdom . | |

OTHER PUBLICATIONS

Patent Abstracts of Japan, vol. 016, No. 041, 31 Jan. 1992.

*Primary Examiner*—Russell D. Stormer
*Attorney, Agent, or Firm*—Sughrue, Mion, Zinn, Macpeak & Seas

[57] ABSTRACT

A rubber track assembly comprising a driving wheel, an idler wheel, an endless rubber track extending around the driving wheel and the idler wheel and having a plurality of rubber lugs formed on its outer circumference and a plurality of rubber guide projections formed on its inner surface, and a plurality of roller wheels arranged in contact with inner surface of the rubber track in a ground contact region thereof, each of the wheels has a pair of wheel portions formed at its opposite sides and spaced apart to be disposed at opposite sides of the guide projection for engaging the inner surface of the rubber track at the opposite sides of the guide projection. The rubber guide projection is provided with at least one low friction surface having a coefficient of friction lower than that of the rubber material of the rubber guide projection.

17 Claims, 14 Drawing Sheets

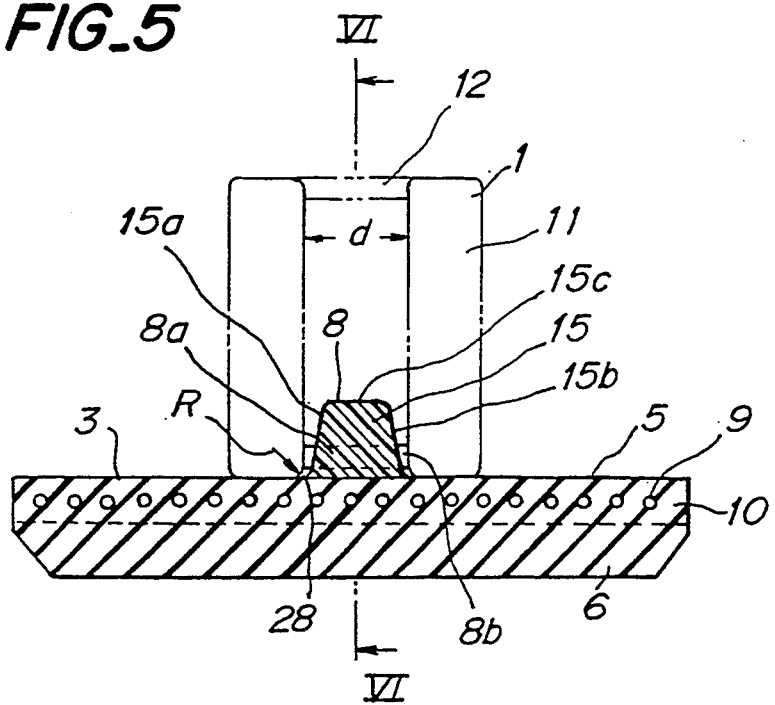
FIG_5
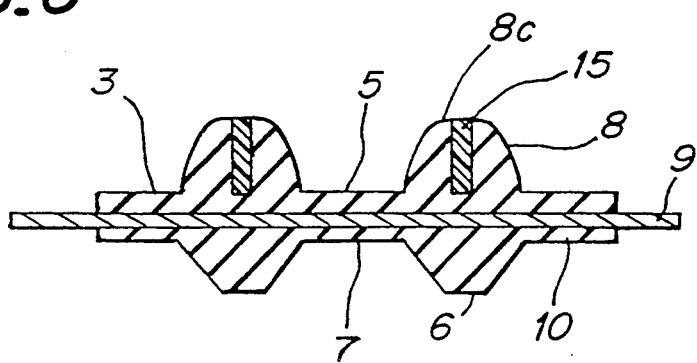
FIG_6

FIG_7
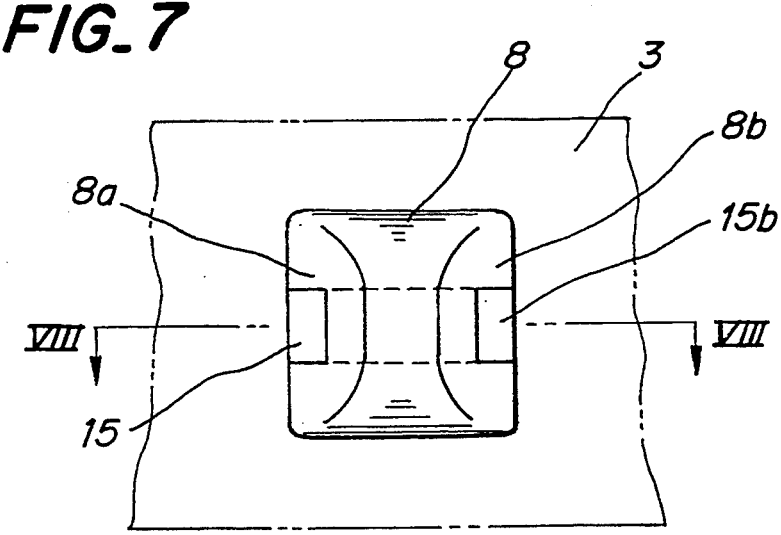
FIG_8
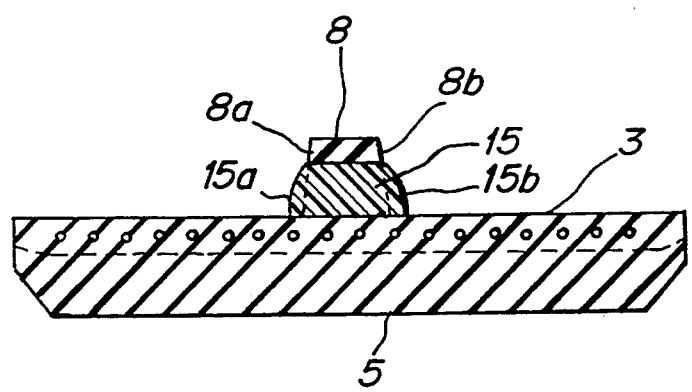

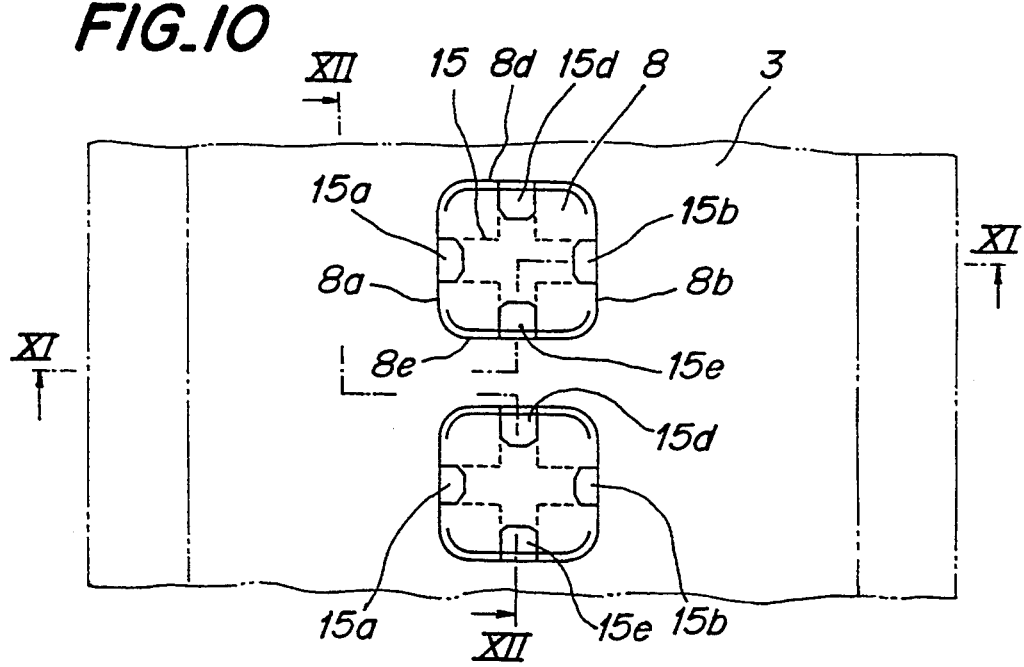
FIG._10
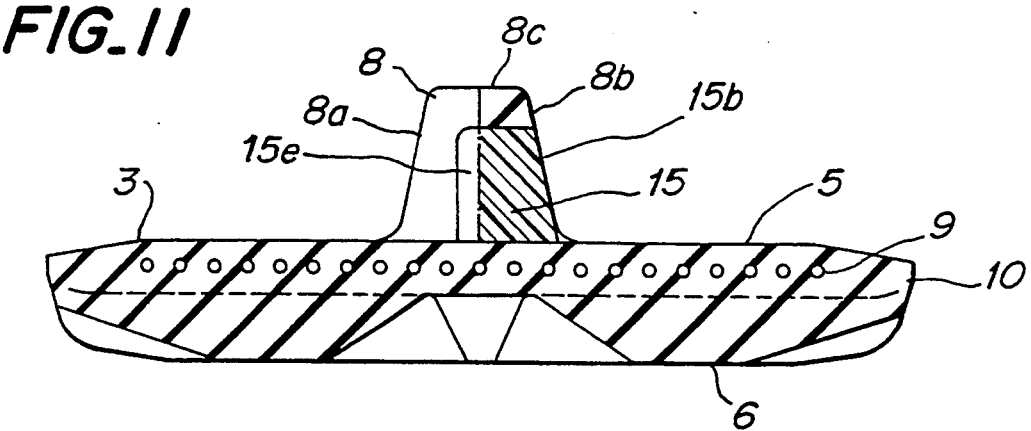
FIG._11
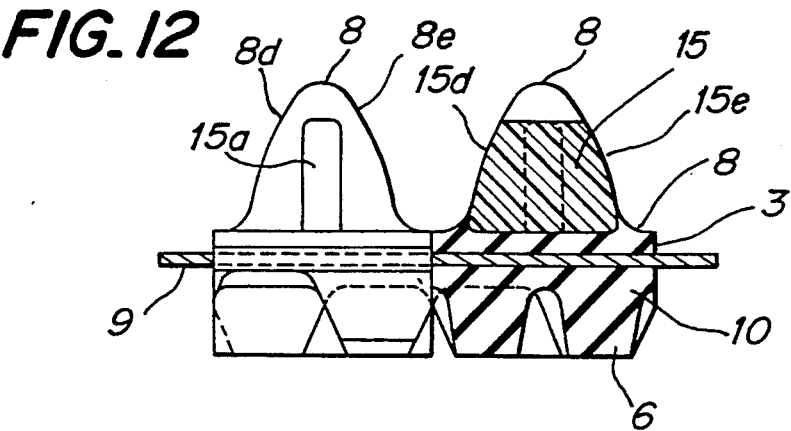
FIG._12

FIG._26
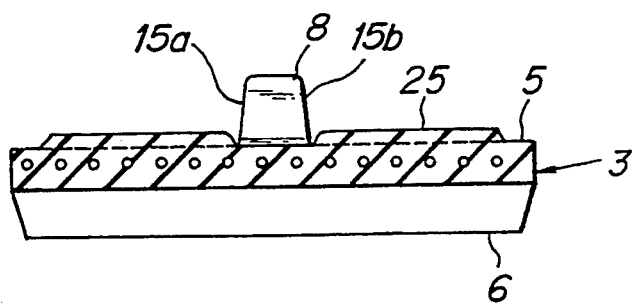
FIG._27
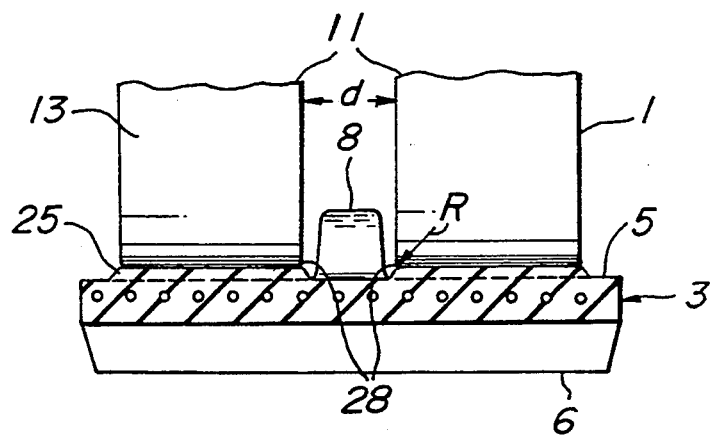
FIG._28
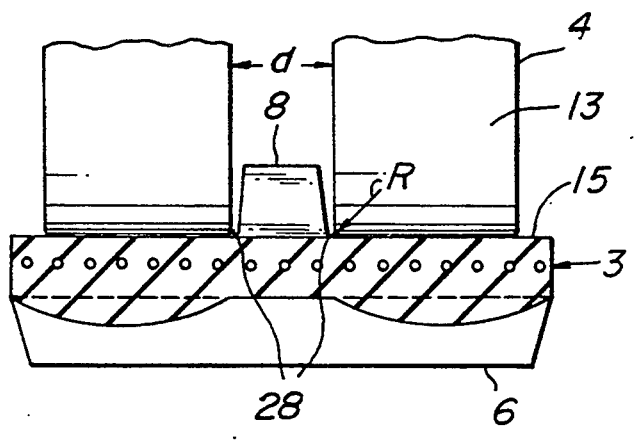

RUBBER TRACK ASSEMBLY

BACKGROUND OF THE INVENTION

1. Field of the Invention

This invention relates to a rubber track assembly for use in construction equipments, agriculture machineries, civil engineering machineries and the like.

2. Description of the Prior Art

A conventional rubber track assembly is shown in FIG. 1. Such a rubber track assembly comprises a driving sprocket wheel 1, an idler wheel 2, an endless rubber track 3 which extends around the driving sprocket wheel 1 and the idler wheel 2, and a plurality of roller wheels 4 arranged in contact with the inner surface 5 of a ground contact region of the rubber track 3 between the driving sprocket wheel 1 and the idler wheel 2.

Furthermore, a conventional rubber track 3 has a plurality of rubber lugs 6 formed on its outer circumference 7, a plurality of rubber guide projections 8 formed on the inner surface 5 to protrude at the central region thereof and spaced to each other by a predetermined distance in the longitudinal direction of the rubber track 3, and steel cords 9 embedded in the rubber material 10 and extended in the longitudinal direction of the rubber track 3 as shown in FIG. 2.

Each of the wheels 1, 2 and 4 has a pair of wheel portions 11 spaced to each other in a direction of the width of the rubber track 3 to contact the inner surface 5 of the rubber track at opposite sides of the rubber guide projection 8 as shown in FIG. 2.

The driving sprocket wheel 1 also includes a plurality of driving members 12 such as drive pins, teeth or the like disposed between the wheel portions 11 and adapted for engaging the guide projections 8 to drive the rubber track 3.

The conventional rubber track assembly has a disadvantage in that when the rubber track assembly is cornering along a curve, the wheel portion 11 is forcedly moved in a lateral direction shown by an arrow A in FIG. 3, and the wheel portion 11 laterally pushes an inclined side surface 8a of the rubber guide projection 8 on the rubber track 3 so that the rubber track is subjected to a side force f which consists of a horizontal component fx and a vertical component fy. Since the side surface 8a of the rubber guide projection of the conventional rubber track assembly is made of rubber having a high coefficient of static friction such as $\mu=0.5$, the vertical component fy cannot cause a sufficiently high horizontal component fx sufficient to overcome the force of friction F between the rubber track 3 and ground G. Accordingly, the wheel 1, 2 or 4 climbs the inclined side surface 8a to trample over the guide projection 8 and, as a result, the wheel is derailed from the rubber track 3, or the guide projection 8 is damaged by the wheel. Also, energy losses are caused by the substantial traveling resistance.

SUMMARY OF THE INVENTION

It is an object of the invention to provide an improved rubber track assembly having superior tracking and a long effective life.

In order to accomplish the object, the present invention provides a low friction surface at a portion on the rubber guide projection which is engaged with the wheel to prevent the wheel from being removed from the rubber track and to also prevent the guide projections from being worn or damaged by the wheel.

According to the present invention, a rubber track assembly is provided with a driving wheel, an idler wheel, an endless rubber track extending around the driving sprocket wheel and the idler wheel and having a plurality of rubber lugs formed on its outer circumference and a plurality of rubber guide projections formed on its inner surface, and a plurality of roller wheels arranged in contact with the inner surface of the rubber track in a ground contact region thereof. In addition, the guide projection is provided with at least one low friction surface having a coefficient of friction lower than that of the rubber material of the rubber guide projection so as to be contacted with the wheel.

The low friction surface may be provided by a low friction member made of low friction material such as ultra-high-molecular polyethylene having a low friction coefficient of $\mu=0.05-0.20$ depending on the partner material and moisture condition. Thus, when the wheel portion contracts the low friction side surface of the guide projection, the horizontal component fx of the side force f subjected to the rubber track by the wheel portion is greater than the vertical component fy as shown in FIG. 4, and is greater than a friction F between the rubber track 3 and ground G so that the rubber track is laterally shifted to prevent the wheel from climbing on the side surface 8a and thereby preventing the wheel from detracking from the rubber track. Accordingly, the rubber track is effectively driven by the wheel during the cornering of the vehicle without loss of driving energy.

In a rubber track assembly comprising a driving sprocket wheel including a pair of wheel portions and driving members such as drive pins, teeth or the like disposed between the wheel portions and adapted for engaging with rubber guide projections to drive the rubber track, the rubber guide projection may be at four side surfaces thereof provided with low friction surfaces having a friction coefficient lower than that of the rubber material of the rubber guide projection.

The rubber guide projections of the rubber track may be provided with the low friction surfaces by inserting low friction members made of material having a low friction coefficient. Such low friction members may be inserted into a metal mold adapted for molding the rubber track so as to expose surfaces of the low friction members at wheel contacting regions of the rubber guide projections and then filling rubber material into the metal mold to form the rubber guide projections integrally with the low friction members.

The low friction member having a low friction coefficient applicable for the rubber guide projection may be made of, for example ceramics, synthetic resin such as nylon and, ultra-high-molecular-weight polyethylene having a molecular weight of at least five hundred thousand. Among others, the ultra-high-molecular-weight polyethylene is preferable in view of light weight, low cost and high adhesion with rubber. Some ultra-high-molecular-weight polyethylene has an average molecular weight of three million to five million and has superior characteristics such as high impact resistance, self-lubricating properties, and an extremely low friction coefficient. The material is available in the form of powder and therefore is able to be easily formed into a desired shape by press forming or injecting in a metal mold.

In a preferred embodiment of the invention, a plate shaped low friction member having a low friction coefficient may be embedded in the central portion of the rubber guide projection and extended through the guide projection in a direction of width of the rubber track to expose opposite end surfaces of the plate shaped member on the inclined opposite side surfaces of the guide projection.

In another preferred embodiment of the invention, a cross shaped low friction member having a low friction coefficient may be embedded in the central portion of the rubber guide projection to expose four end surfaces of the cross shaped member on the four side surfaces of the rubber guide projection, respectively.

Alternatively an angle shaped member having a low friction coefficient may be arranged on the rubber guide projection to cover the inclined opposite side surfaces with the angle shaped member or a cap shaped member having a low friction coefficient may be arranged on the rubber guide projection to cover the rubber guide projection. Furthermore, two plate members having a low friction coefficient may be arranged on the inclined opposite side surfaces of the rubber guide projection, respectively, to cover the opposite side surfaces of the rubber guide projection with the plate members. The plate member or plate members covering the side surfaces of the rubber guide projection may be extended to the inner tracking surface of the rubber track at the opposite sides of the guide projection.

Furthermore, in a preferred embodiment of the invention, in order to improve transmission of driving force from the driving sprocket wheel to the rubber track, the driving sprocket wheel may be provided with a plurality of driving members in the form of elongated drive pins arranged at a constant interval on the peripheries of the wheel portions and extended transversally over a range of ⅓–4/5 of the width rubber track, while the rubber track is provided with grooves transversely formed on the inner surface of the rubber track between the guide projections for engaging with the drive pins.

In still another embodiment of the invention, the rubber track may have a plurality of protrusions formed in a wave shape on the inner tracking surfaces at the opposite sides of the guide projections, while the driving sprocket wheel having a pair of wheel portions integrally formed with drum portions is provided with a plurality of recess formed on the outer periphery of the drum portions for receiving the wave shaped protrusions.

The protrusions preferably protrude on the inner surface of the rubber track at positions corresponding to regions between the rubber lugs on the outer circumference of the rubber track.

Moreover, the wheel portions of the wheel preferably have openings for permitting earth and sand to be discharged from between wheel portions.

Each of the wheel portions preferably has a rounded corner at its inner side formed with a radius of curvature of 1/20–1/5 of the distance between the pair of wheel portions so as to be smoothly contacted with the low friction side surface of the guide projection.

The above and other objects, features and advantages of the invention will become more apparent from the following description when taken in conjunction with the accompanying drawings in which preferred embodiments of the invention are shown by way of illustrative example.

BRIEF DESCRIPTION OF THE DRAWINGS

FIG. 5 is a cross sectional view illustrating a preferred first embodiment of a rubber track according to the invention;

FIG. 6 is a sectional view taken along a line VI—VI in FIG. 5;

FIG. 7 is a plan view illustrating a modification of the embodiment of a rubber track shown in FIG. 5;

FIG. 8 is a sectional view taken along a line VIII—VIII in FIG. 7;

FIG. 10 is a fragmental plan view of a rubber track illustrating another embodiment of the invention;

FIG. 11 is a sectional view taken along a line XI—XI in FIG. 10;

FIG. 12 is a sectional view taken along a line XII—XII in FIG. 10;

FIG. 26 is a cross sectional view of the rubber track shown in FIG. 25;

FIG. 27 is a sectional view of the rubber track contacting the driving wheel shown in FIG. 25;

FIG. 28 is a sectional view of the rubber track contacting the roller wheel shown in FIG. 25;

DESCRIPTION OF THE PREFERRED EMBODIMENTS

Figure 1:
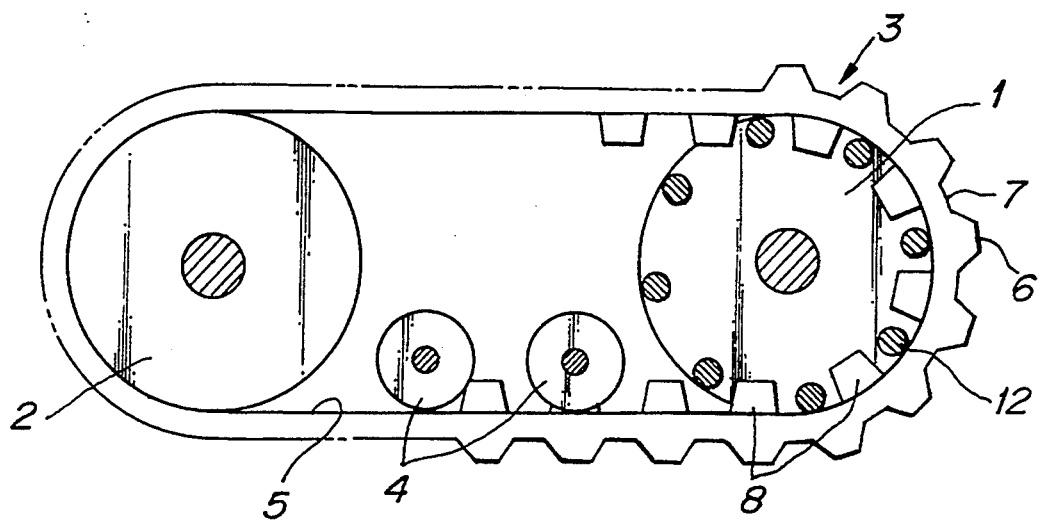
FIG. 1 is a side view illustrating a conventional rubber track assembly.
Figure 2:
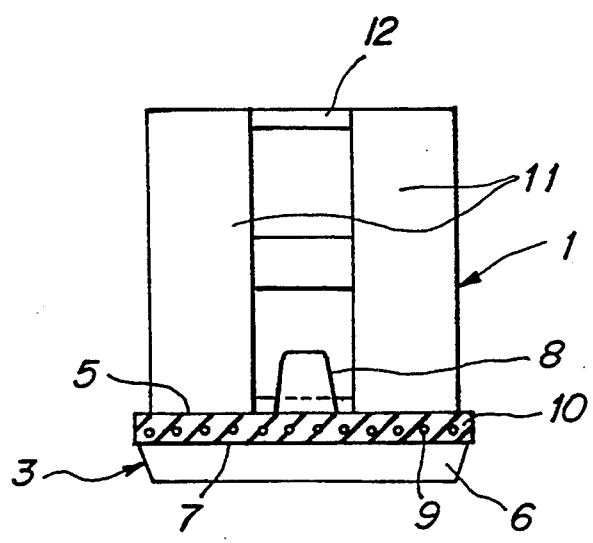
FIG. 2 is a front view illustrating a driving sprocket wheel shown in FIG. 1.
Figure 3:
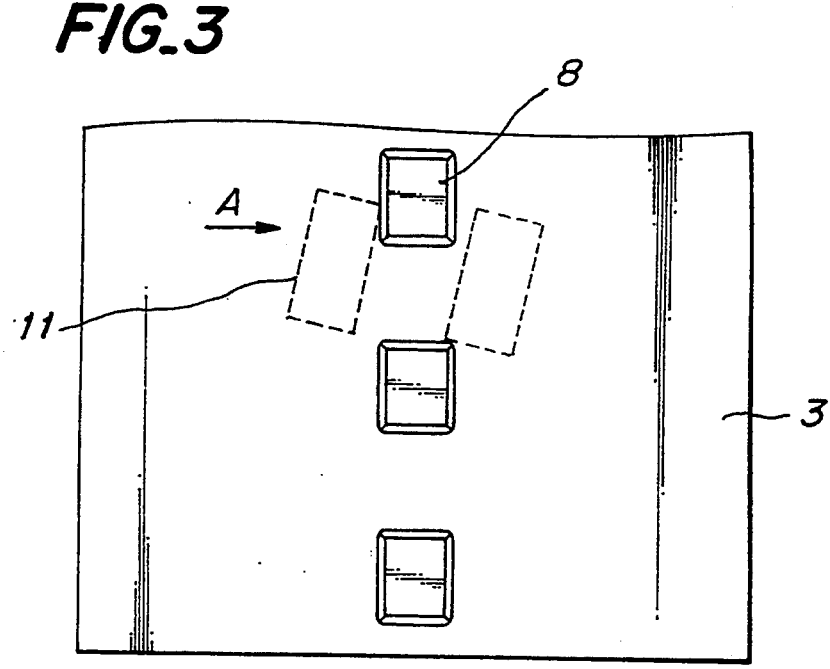
FIG. 3 illustrates a roller wheel contacting a side inclined surface of a rubber guide projection during cornering of a vehicle.
Figure 4:
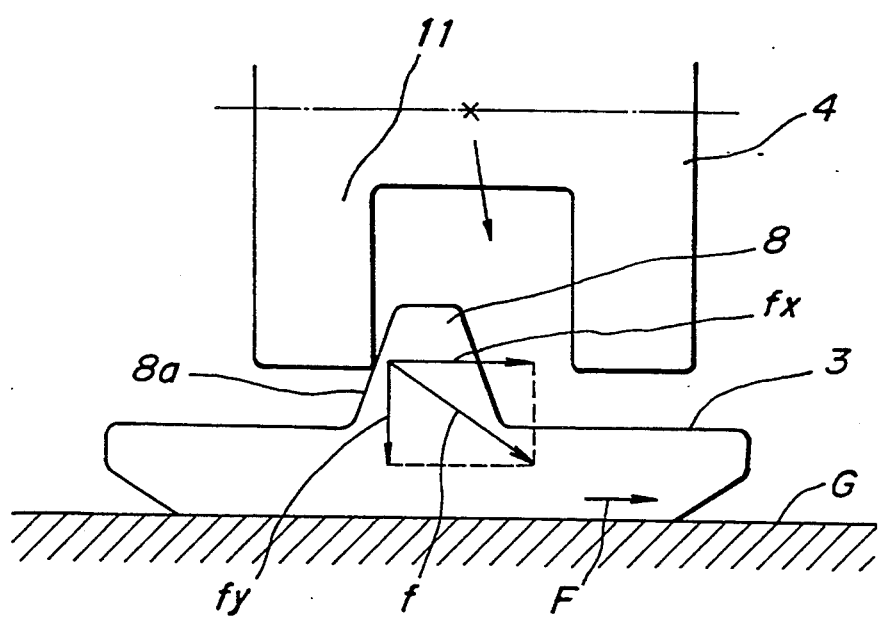
FIG. 4 is an explanatory view of a side force applied to a rubber track by a roller wheel.

Referring to FIGS. 5 and 6 illustrating a first embodiment of the invention, a rubber guide projection 8 protrudes at the central portion of the inner surface 5 of the rubber track 3. A plate shaped low friction member 15 having a low friction coefficient is embedded in the central portion of the rubber guide projection 8 and extended through the guide projection to expose opposite ends surfaces 15a and 15b and a top surface 15c of the plate shaped member 15 on central portions of inclined opposite side surfaces 8a and 8b and the top surface 8c of the rubber guide projection 8.

The plate shaped low friction member 15 is made of ultra-high-molecular-weight polyethylene having a molecular weight of three million and is inserted in a metal mold for molding the rubber track 3 at a recessed portion corresponding to the guide projection to be molded integrally with the rubber guide projection.

The plate shaped low friction member 15 is exposed on surfaces of the opposite sides 8a and 8b and the top portion 8c of the guide projection 8 as mentioned above so as to contact the driving sprocket wheel 1, idler wheel 2 and roller wheels 4 to prevent the rubber track from detracking from the rubber track assembly.

FIGS. 7 and 8 illustrate a modification of the embodiment shown in FIG. 5. In this modification, the plate shaped low friction member 15 is exposed only on the opposite side surfaces 8a and 8b in the width direction of the rubber guide projection 8.

Figure 9:
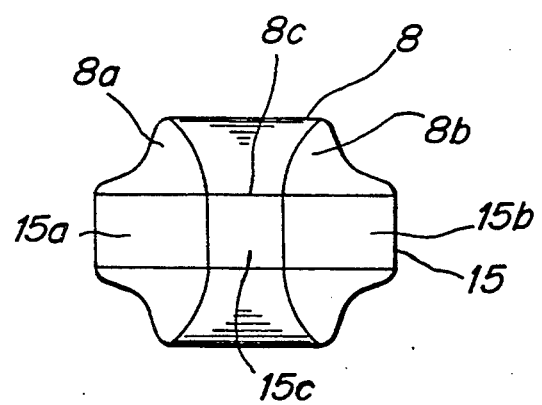
FIG. 9 is a plan view illustrating other modification of the embodiment shown in FIG. 5.

FIG. 9 illustrates still other modification of the embodiment shown in FIG. 5. In this modification, the plate shaped low friction member 15 exposes on the opposite side surface 8a and 8b in the width direction and top surface 8c of the rubber guide projection 8.

FIGS. 10 to 12 illustrate another embodiment of the rubber track 3 according to the invention. In this embodiment, a cross shaped low friction member 15 having a low friction coefficient is embedded in the central portion of the rubber guide projection 8 to expose four end surfaces 15a, 15b, 15d and 15e of the cross shaped member 15 on the four side surfaces 8a, 8b, 8d and 8e of the rubber guide projection 8, respectively. It should be noted that the cross shaped low friction member 15 may be set in the metal mold to expose the upper surface of the cross shaped member 15 on the top surface 8c of the rubber guide projection 8.

Such a rubber track 3 having the low friction surfaces 15d and 15e on the front and rear surface of the rubber guide projection in the longitudinal direction of the rubber track 3 is preferably driven by a driving member such as drive pins or teeth of the driving sprocket wheel of the rubber track assembly without damage or wear of the rubber guide projection. The cross shaped low friction member may be formed by a unitary body or divided into four pieces.

Figure 13:
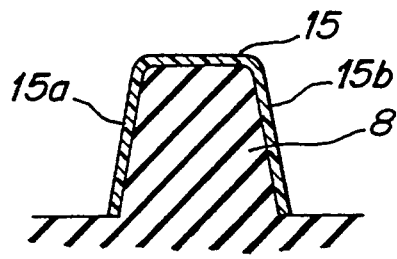
FIG. 13 is a vertical sectional view of a rubber guide projection illustrating another embodiment of the invention.

FIG. 13 illustrates another embodiment of the invention, in which the rubber guide projection 8 is capped with a cap shaped low friction member 15.

Figure 14:
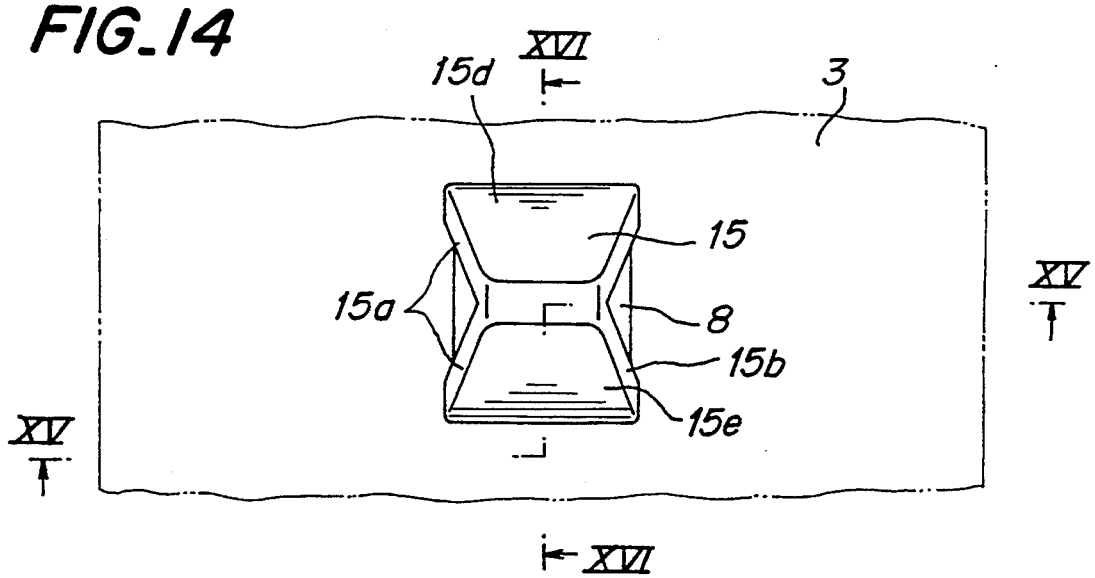
FIG. 14 is a fragmental plan view of a rubber track of another embodiment of the invention.
Figure 15:
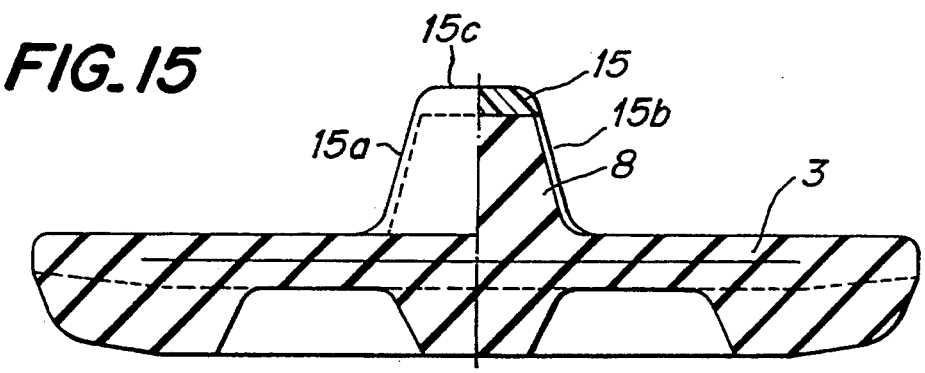
FIG. 15 is a sectional view taken along a line XV—XV in FIG. 14.
Figure 16:
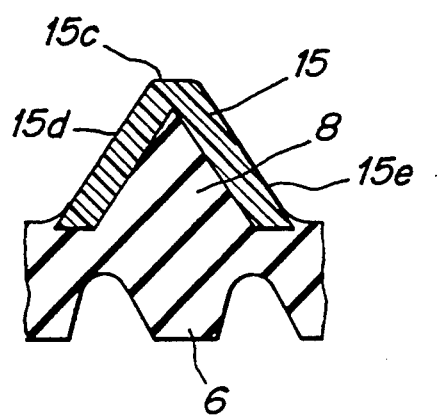
FIG. 16 is a sectional view taken along a line XVI—XVI in FIG. 14.

FIGS. 14-16 illustrate still another embodiment of the invention, in which the rubber guide projection 8 is covered with an angle shaped low friction member 15 to provide inclined side low friction surfaces 15a, 15b, 15d and 15e and a top low friction surface 15c.

Figure 17:
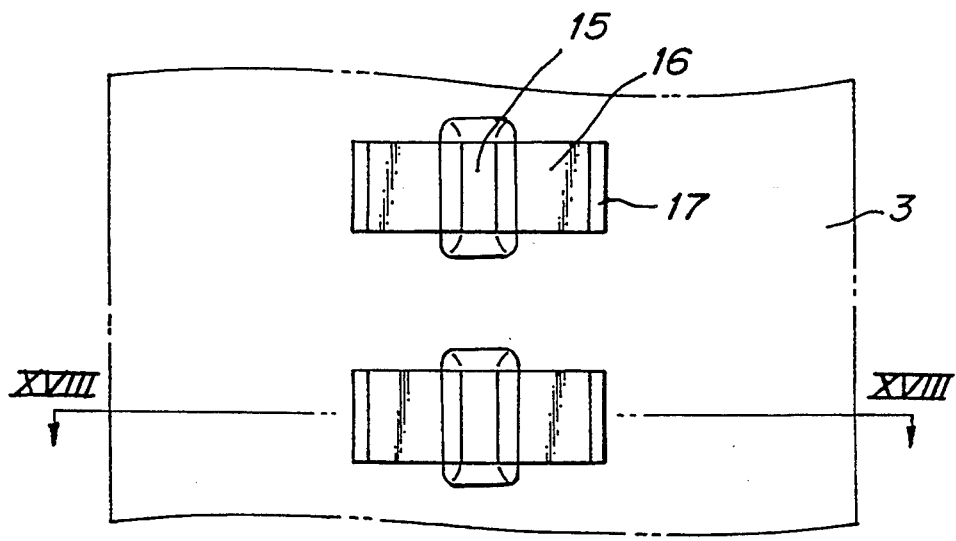
FIG. 17 is a plan view of another embodiment of the invention.
Figure 18:
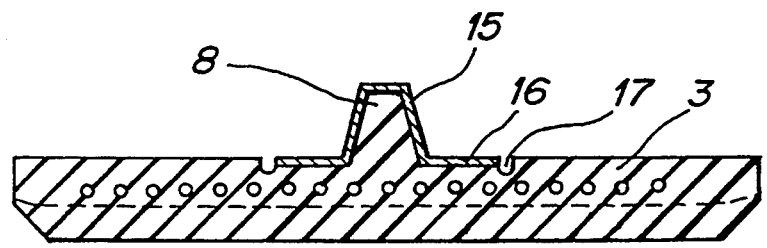
FIG. 18 is a sectional view taken along a line XVIII—XVIII in FIG. 17.

FIGS. 17 and 18 illustrate another embodiment of the invention, in which the rubber guide projection 8 is capped with a cap shaped low friction member 15 having extensions 16 which extend onto the inner tracking surface 5 of the rubber track 3 at the opposite sides of the guide projection 8 and terminate at grooves 17, respectively, which are formed in the inner tracking surface 5.

Figure 19:
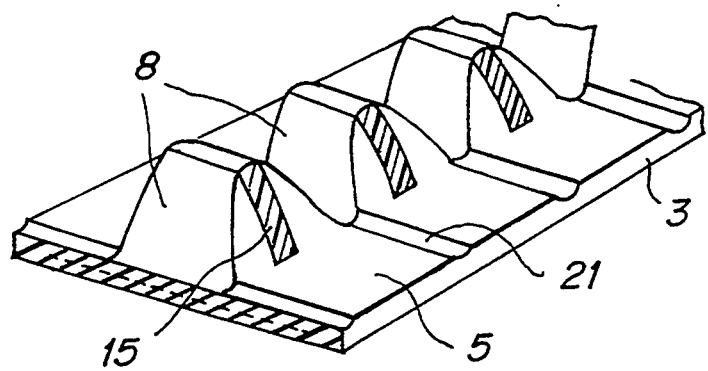
FIG. 19 is a perspective view of a preferred another embodiment of a rubber track according to the invention.
Figure 20:
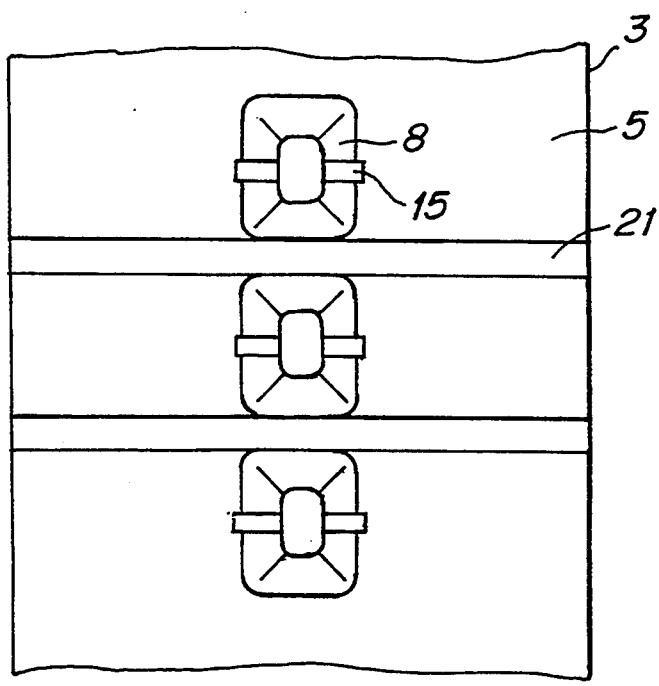
FIG. 20 is a plan view of the rubber track shown in FIG. 19.
Figure 21:
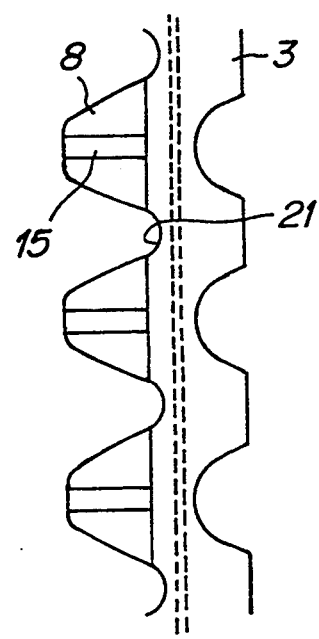
FIG. 21 is a side view of the rubber track shown in FIG. 20.
Figure 22:
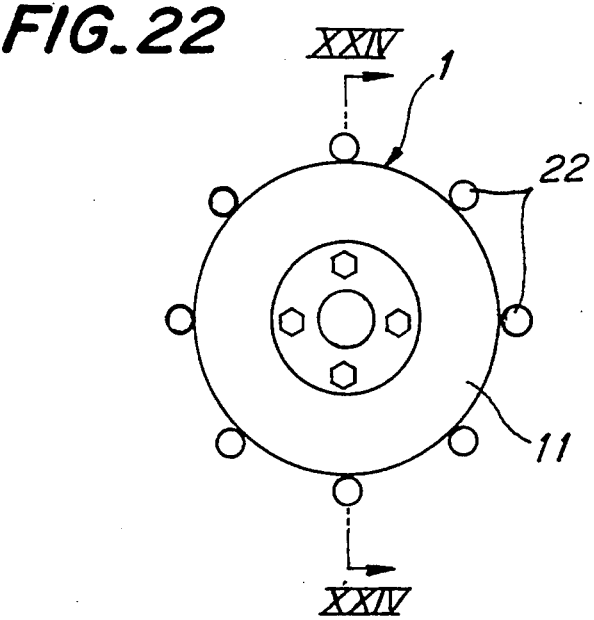
FIG. 22 is a front view illustrating a preferred embodiment of a driving sprocket wheel adapted to the embodiment shown in FIG. 19.
Figure 23:
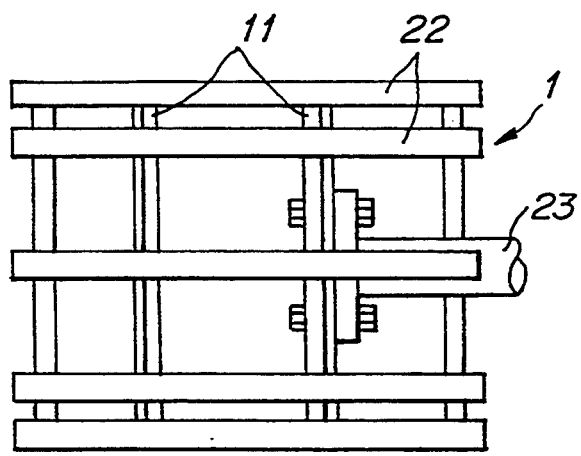
FIG. 23 is a side view of the driving sprocket wheel shown in FIG. 22.
Figure 24:
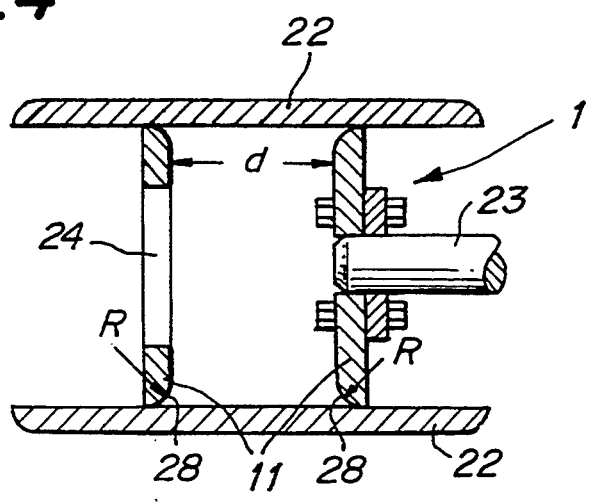
FIG. 24 is a vertical sectional view of a driving sprocket wheel shown in FIG. 23.
Figure 25:
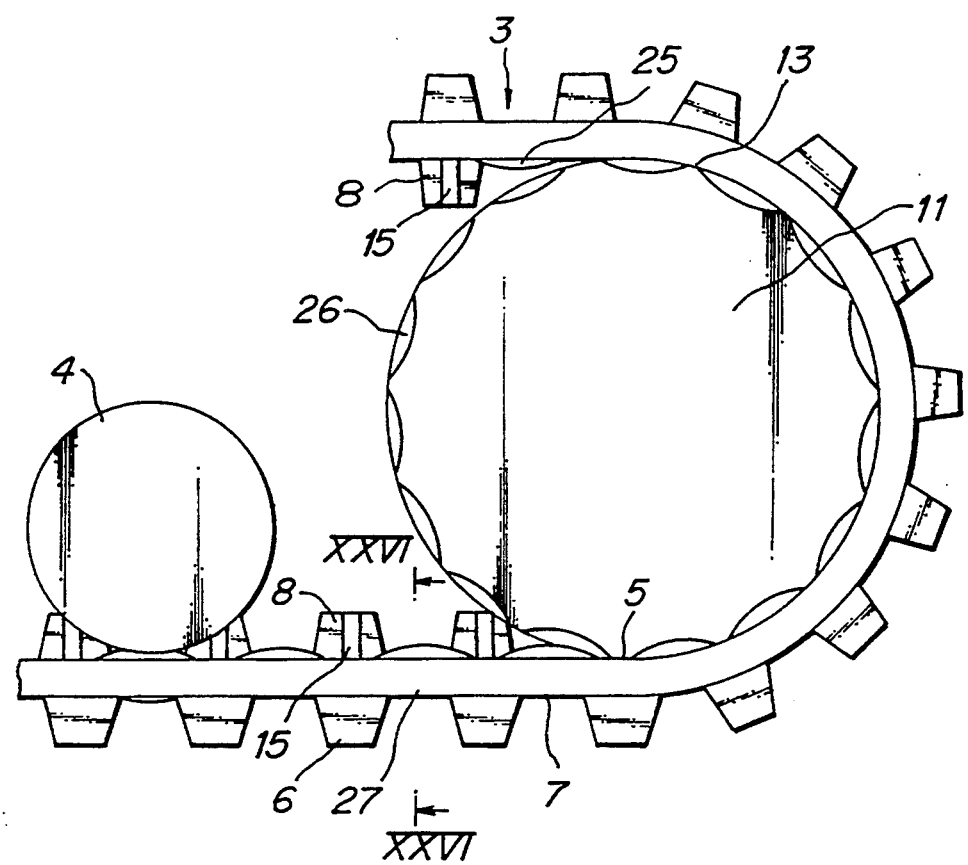
FIG. 25 illustrates another embodiment of a rubber track assembly of the invention.

FIGS. 19-24 illustrate another embodiment of the invention. Referring to FIGS. 19-21, the rubber track 3 is provided with grooves 21 which extend transversely the inner tracking surface 5 between the guide projections 8. Referring to FIGS. 22-24, the driving sprocket wheel 1 is provided with a plurality of driving members in the form of elongated drive pins 22 arranged at a constant interval on the peripheries of the wheel portions 11 and extend transversely over the full width of the driving sprocket wheel and/or a range of ½-4/5 width of the rubber track 3.

Thus, in this embodiment, the drive pins 22 of the driving sprocket wheel 1 engage the groove 2 in the rubber track 3 to positively transmit driving force from the driving sprocket wheel 1 to the rubber track 3 when the sprocket wheel 1 is driven by a driving shaft 23 of vehicle. One of the wheel portions 11 of the driving sprocket wheel 1 has an opening 24 for permitting earth and sand to be discharged from the space between wheel portions 11.

FIGS. 25-28 illustrate another embodiment, in which the rubber track 3 has a plurality of protrusions 25 formed in the wave shape on the inner track surface 5 at the opposite sides of the guide projections 8, and the driving sprocket wheel 1 has a plurality of recesses 26 formed on outer peripheries 13 of wheel portions 11 for receiving the wave shaped protrusions 25. The protrusions protrude on the inner track surface 5 of the rubber track 3 at positions corresponding to regions 27 between the rubber lugs 6 on the outer circumference 7 of the rubber track 3.

Each of the wave shaped protrusions 25 has a height of 5-20% of the lug pitch of the rubber lugs 6 formed on the outer circumference 7 of the rubber track.

In FIGS. 5, 24, 27 and 28, the reference numeral 28 designates a rounded corner having a radius of corvature R of 1/20-1/5 of the distance (d) between the pair of wheel portions 11.

Figure 29:
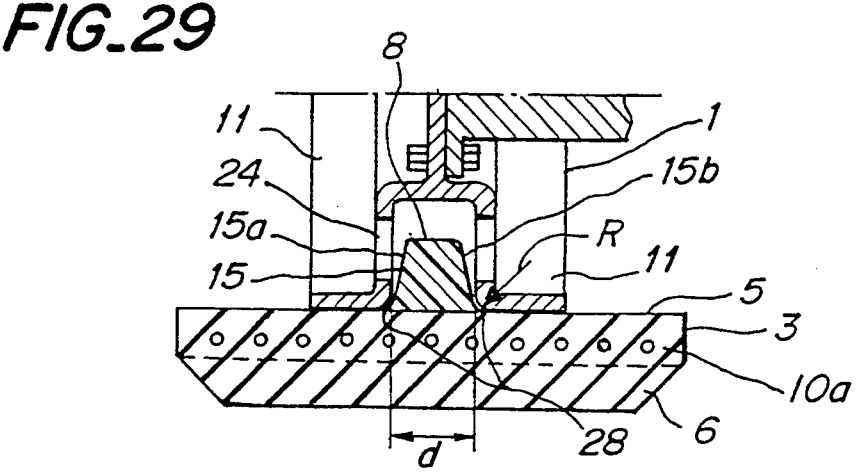
FIG. 29 is a sectional view illustrating an embodiment of a driving wheel of friction drive type.

Referring to FIG. 29 illustrating an embodiment of the rubber track assembly including a driving wheel 1 of friction drive type, the rubber guide projection 8 has low friction surfaces 8a and 8b provided by a plate shaped member 15 having a low friction coefficient and each of the wheel portions 11 of the driving wheel 1 also has a rounded corner 28 having a radius of curvature R of 1/20-1/5 of the distance (d) between the pair of wheel portions 11.

Figure 30:
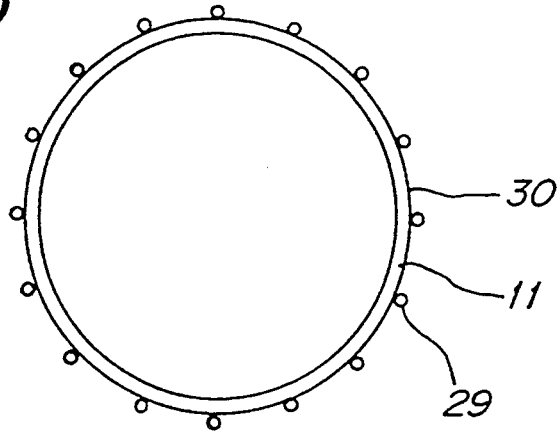
FIG. 30 is a side view illustrating an embodiment of a wheel portion of friction drive type.

FIG. 30 illustrates a modification of a driving wheel 1 of friction drive type which is provided with a plurality of steel rods 29 welded to the peripheral surface 30 of the wheel portion 11 and spaced at an interval in the circumferential direction. The steel rod 29 preferably has a diameter of 1/10-½ of the thickness of the inner rubber layer 10a (FIG. 29) of the rubber track 3.

Figure 31:
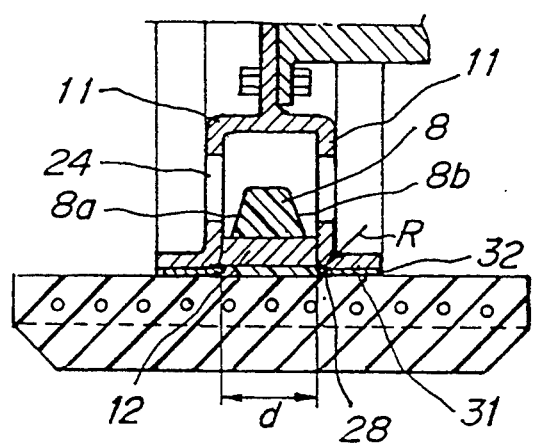
FIG. 31 is a sectional view illustrating an embodiment of a driving wheel of pin drive type.

FIG. 31 illustrates a modification of a driving wheel 1 of the pin drive type which is provided with a low friction surface 31 formed by a low friction material 32 such as nylon adhered on the peripheral surface of the wheel portion 11 which contacts the inner surface 5 of the rubber track 3.

What is claimed is:

1. A rubber track assembly comprising: a driving wheel; an idler wheel; an endless rubber track extending around the driving wheel and the idler wheel and having a plurality of rubber lugs formed on an outer circumference of the track and a plurality of rubber guide projections arranged on an inner surface of the track at a predetermined distance in a longitudinal direction of the track, each of the rubber guide projections protruding from the inner surface at a central portion in a widthwise direction thereof; and a plurality of roller wheels arranged in contact with the inner surface of the track in a ground contact region thereof wherein each of the driving wheel, the idler wheel and the roller wheels including a pair of wheel portions spaced apart from each other in the widthwise direction of the track, and each of the rubber guide projections is provided with a low friction member having a coefficient of friction lower than that of a rubber material of the rubber guide projection and at least extended through the rubber guide protrusion in the widthwise direction of the track so as to expose opposite end surfaces of the low friction member on opposite side surfaces of the rubber guide projection, said low friction member contacting one of the wheel portions in one of the driving wheel, the idler wheel and the roller wheels in the cornering of the rubber track assembly along a curve to reduce a lateral component of a friction force therebetween to a level sufficiently small to prevent said one of the wheel portions from riding over the rubber guide projection.

2. The rubber track assembly according to claim 1, wherein said low friction member comprises a low friction material selected from one of nylon and ultra-high-molecular polyethylene having a molecular weight of at least 500,000.

3. The rubber track assembly according to claim 2, wherein said low friction members are two plate members having a low friction coefficient and arranged on inclined opposite side surfaces of the rubber guide projection, respectively, to cover the opposite side surfaces of the rubber guide projection.

4. The rubber track assembly according to claim 2, wherein said low friction member is an angle shaped member having a low friction coefficient and arranged on the rubber guide projection to cover inclined opposite side surfaces.

5. The rubber track assembly according to claim 2, wherein said low friction member is a cap shaped member having a low friction coefficient and capped on the rubber guide projection.

6. The rubber track assembly according to claim 2, wherein said low friction member is at least one of plate member covering opposite side surfaces of the rubber guide projection and extending on the inner tracking surface of the rubber track at the opposite sides of the guide projection.

7. The rubber track assembly according to claim 2, wherein said low friction member is a cross shaped low friction member having a low friction coefficient and embedded in the central portion of the rubber guide projection to expose four end surfaces of the cross shaped member on four side surfaces of the rubber guide projection, respectively.

8. The rubber track assembly according to claim 1, wherein said low friction member comprises a plate-shaped member embedded in one or more of the rubber guide projections and extending through the one or more guide projections in a direction of width of the track to expose opposite end surfaces of the plate shaped member on opposite side surfaces of the guide projection.

9. The rubber track assembly according to claim 1, wherein each of said wheels has a pair of wheel portions formed at its opposite sides and spaced apart to be disposed at opposite sides of the guide projection for engaging the inner surface of the rubber track at the opposite sides of the guide projection.

10. The rubber track assembly according to claim 9, wherein each of said wheel portions has a rounded corner at its inner side formed with a radius of curvature of 1/20–1/5 distance between the pair of wheel portions.

11. The rubber track assembly according to claim 9, wherein at least one of the pair of wheel portions has at least one opening for permitting to discharge earth and sand out of space between wheel portions.

12. The rubber track assembly according to claim 9, wherein said driving wheel has a plurality of driving members such as drive pins, teeth or the like which are disposed between the wheel portions and adapted for engaging the guide projections to positively drive the rubber track.

13. The rubber track assembly according to claim 12, wherein said wheel portions are covered at their peripheries with a low friction material.

14. The rubber track assembly according to claim 9, wherein said driving wheel is provided at peripheries of its wheel portions with a plurality of metallic rods spaced to each other and having a diameter of $1/10-\frac{1}{2}$ thickness of inner rubber layer of the rubber track.

15. The rubber track assembly according to claim 1, wherein said rubber track has plurality of protrusions formed in the wave shape on the inner tracking surface at the opposite sides of the guide projections, and the driving wheel has a pair of wheel portions formed with a plurality of recesses on their outer peripheries for receiving the wave shaped protrusions.

16. The rubber track assembly according to claim 15, wherein said protrusions protrude on the inner surface of the rubber track at positions corresponding to regions between the rubber lugs on the outer circumference of the rubber track.

17. The rubber track assembly according to claim 15, wherein each of the protrusions has a height of 5–20% lug pitch of the rubber lugs.

* * * * *